United States Patent
Henson et al.

(10) Patent No.: US 9,557,632 B2
(45) Date of Patent: Jan. 31, 2017

(54) ROLLED PROJECTION SCREEN

(71) Applicant: MILESTONE AV TECHNOLOGIES LLC, Eden Prairie, MN (US)

(72) Inventors: Tim Henson, Warsaw, IN (US); Jim Fisher, Warsaw, IN (US)

(73) Assignee: Milestone AV Technologies LLC, Eden Prairie, MN (US)

( * ) Notice: Subject to any disclaimer, the term of this patent is extended or adjusted under 35 U.S.C. 154(b) by 0 days.

(21) Appl. No.: 14/437,436

(22) PCT Filed: Mar. 12, 2013

(86) PCT No.: PCT/US2013/030546
§ 371 (c)(1),
(2) Date: Aug. 10, 2015

(87) PCT Pub. No.: WO2014/070228
PCT Pub. Date: May 8, 2014

(65) Prior Publication Data
US 2015/0338730 A1 Nov. 26, 2015

Related U.S. Application Data

(60) Provisional application No. 61/720,251, filed on Oct. 30, 2012.

(51) Int. Cl.
*G03B 21/58* (2014.01)
*G03B 21/60* (2014.01)

(52) U.S. Cl.
CPC .............. *G03B 21/58* (2013.01); *G03B 21/60* (2013.01); *Y10T 29/49828* (2015.01)

(58) Field of Classification Search
CPC .......... G03B 21/58; G03B 21/56; G03B 21/60
(Continued)

(56) References Cited

U.S. PATENT DOCUMENTS 4,159,162 A * 6/1979 Christoffel ............. G03B 21/58
160/24
5,274,499 A * 12/1993 Shopp .................... G03B 21/58
359/461

(Continued)

FOREIGN PATENT DOCUMENTS

JP     05-311962 A    11/1993
JP   2007-112627 A     5/2007
(Continued)

OTHER PUBLICATIONS

PCT Notification Concerning Transmittal of International Preliminary Report on Patentability, International Preliminary Report on Patentability, and Written Opinion of the International Searching Authority for PCT/US2013/030546, mailed May 14, 2015, 10 pgs.
(Continued)

*Primary Examiner* — Christopher Mahoney
(74) *Attorney, Agent, or Firm* — Patterson Thuente Pedersen, P.A.

(57) ABSTRACT

A roller projection screen, including a projection screen material having a reflective front surface, onto which an image may be projected, and a back surface. The projection screen material is secured to a roller at an upper edge of the material and the projection screen material can be rolled in a spiral fashion in multiple layers around the roller. A buffer material is secured to the roller or to the back surface of the projection screen material so as to be adjacent the back surface and so as the be interposed between at least some of the multiple layers of the projection screen material when the projection screen material is rolled about the roller so as to inhibit ladder marks in the projection screen material.

18 Claims, 5 Drawing Sheets

(58) Field of Classification Search
USPC .......................................................... 359/461
See application file for complete search history.

(56) References Cited

U.S. PATENT DOCUMENTS

| | | | | |
|---|---|---|---|---|
| 7,911,695 B2* | 3/2011 | Maruta | .................. | G03B 21/56 |
| | | | | 359/461 |
| 8,649,092 B2* | 2/2014 | Aoki | ...................... | G03B 21/58 |
| | | | | 359/461 |
| 2008/0002254 A1 | 1/2008 | Congard et al. | | |

FOREIGN PATENT DOCUMENTS

| KR | 10-2011-0062462 A | 6/2011 |
|---|---|---|
| KR | 10-2012-0073539 A | 7/2012 |

OTHER PUBLICATIONS

International Search Report and Written Opinion of the International Searching Authority for PCT/US2013/030546 filed Mar. 12, 2013, mailed Jul. 25, 2013, 14 pages.

* cited by examiner

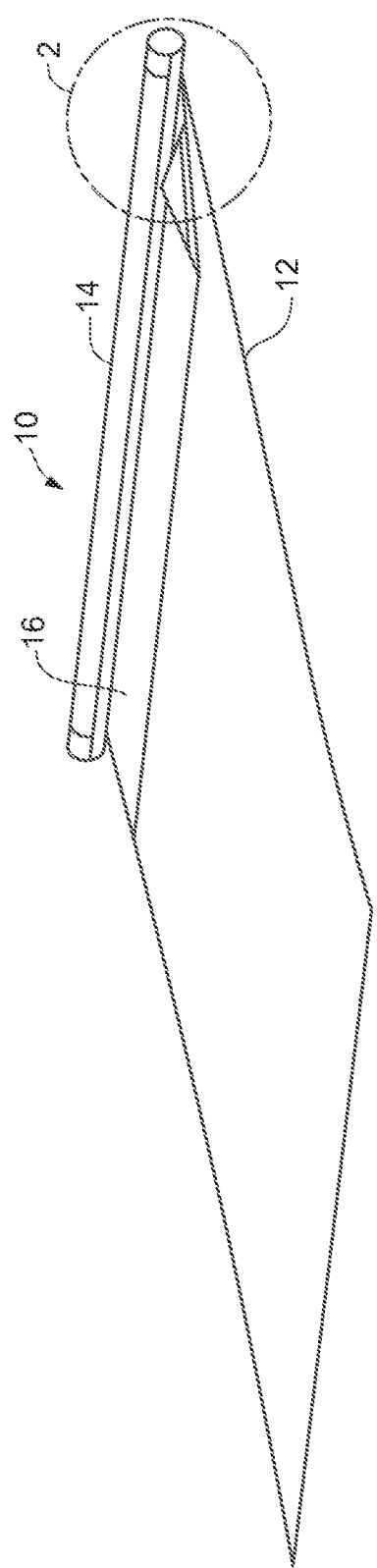

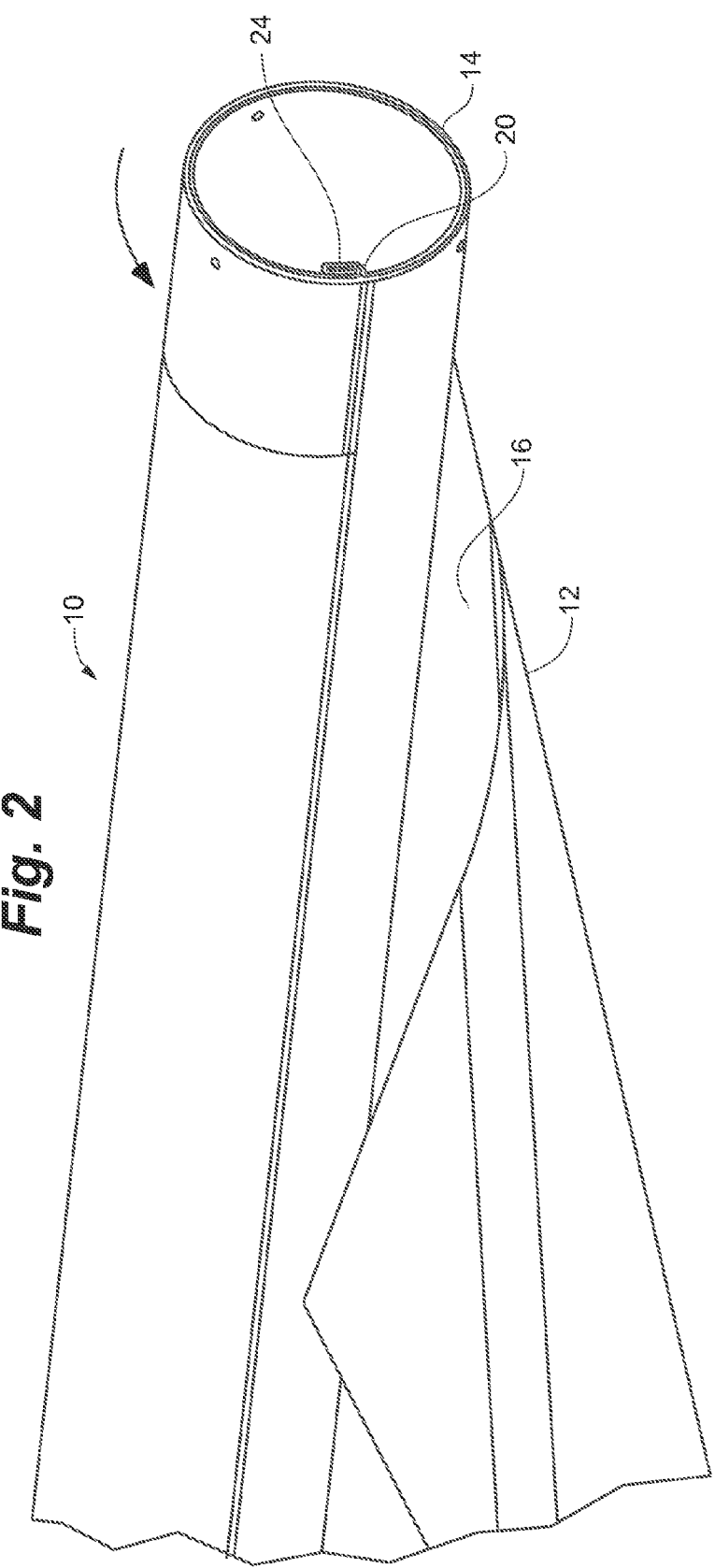

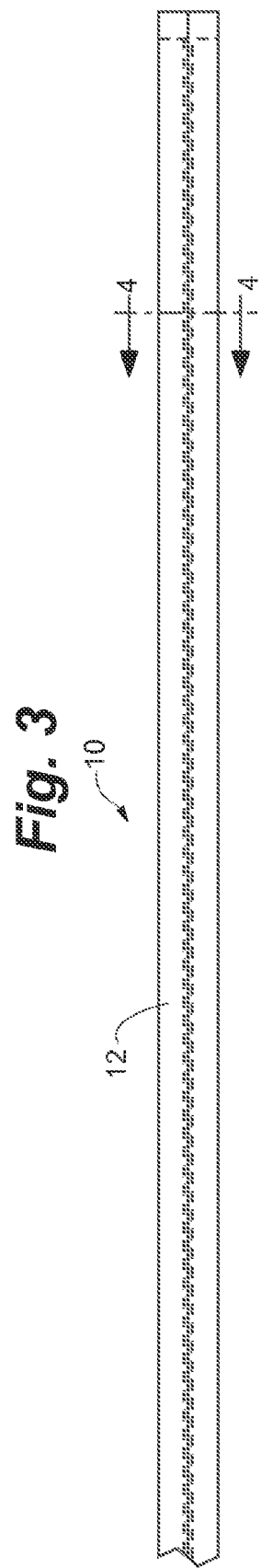

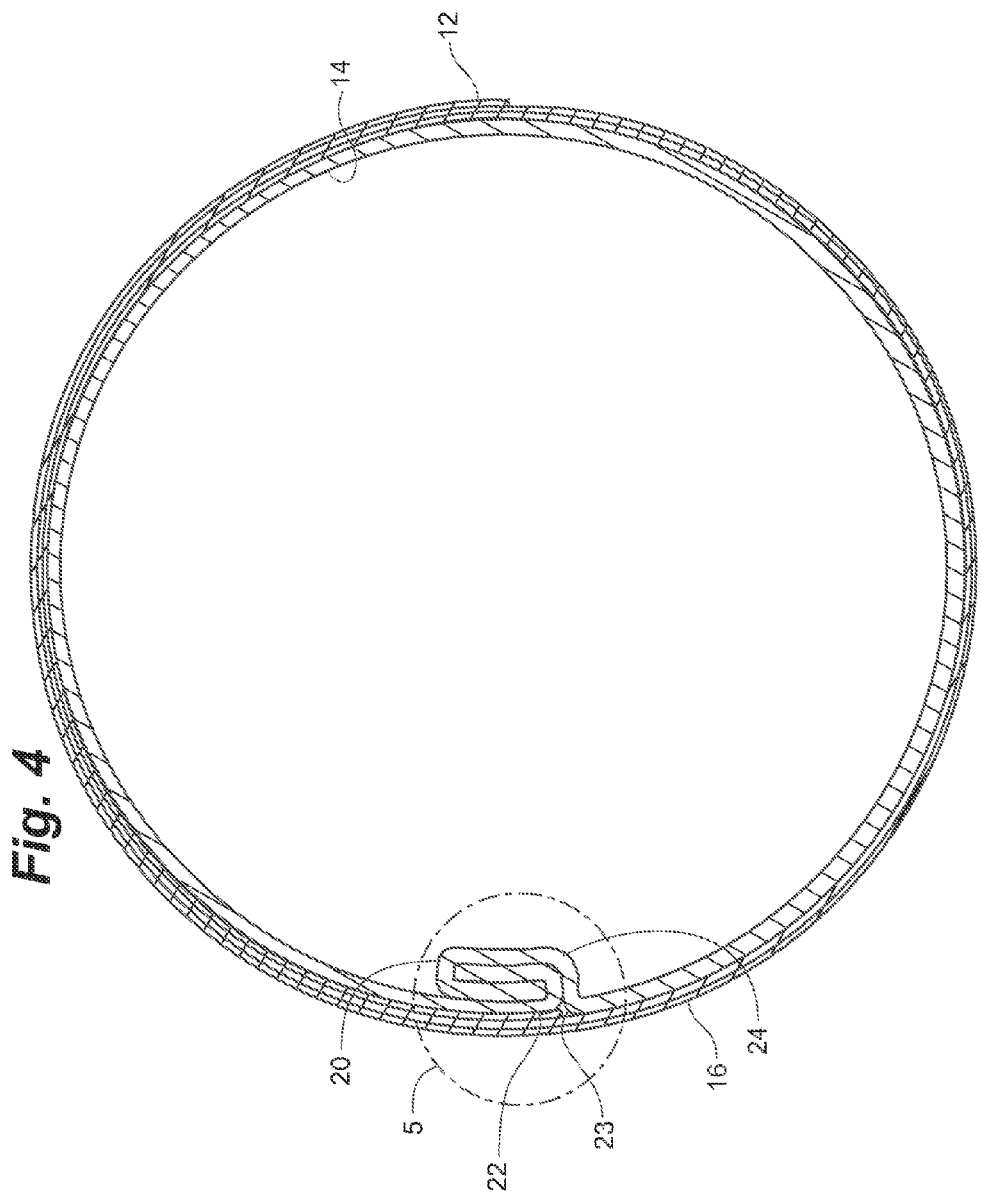

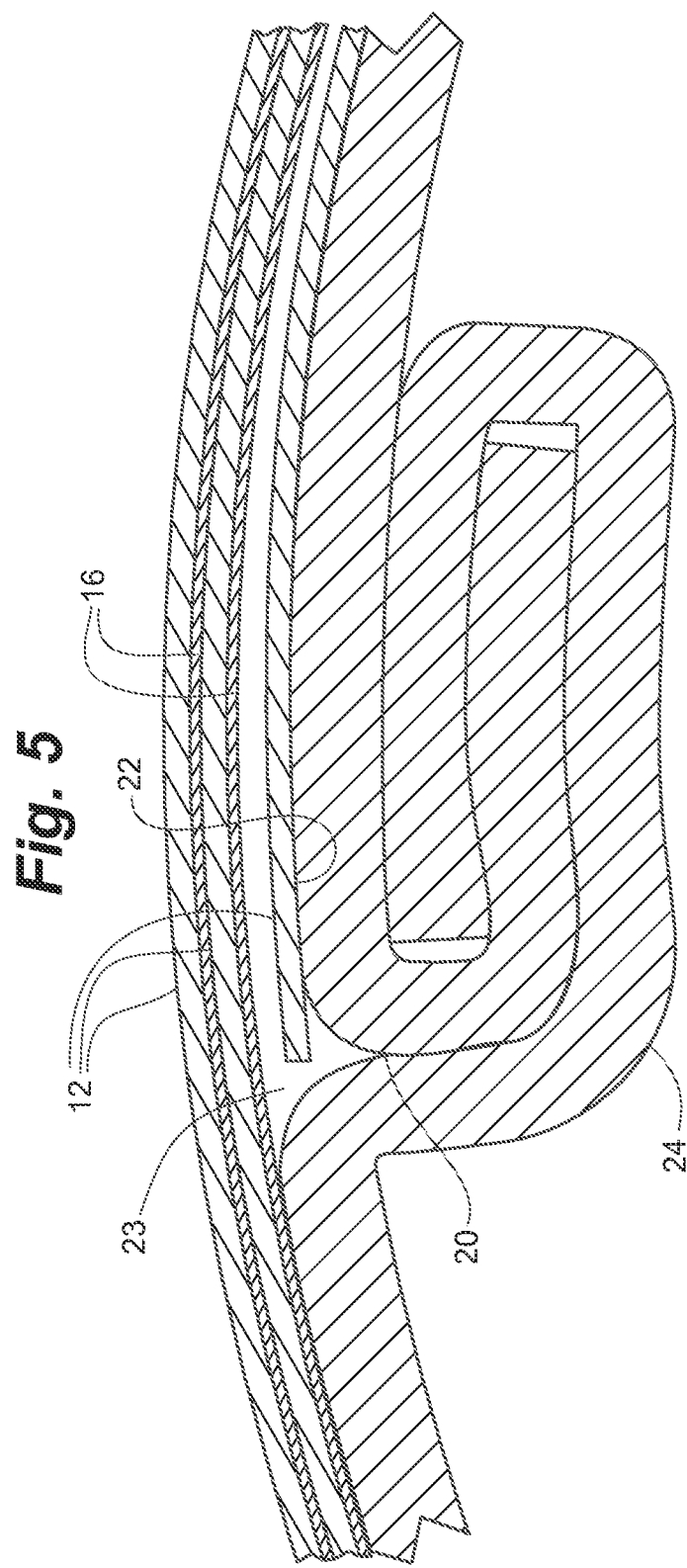

ROLLED PROJECTION SCREEN

RELATED APPLICATIONS

This application is a National Phase entry of PCT Application No. PCT/US2013/030546 filed Mar. 12, 2013, which application claims the benefit of priority to U.S. Provisional Patent Application No. 61/720,251 filed Oct. 30, 2012, the entire disclosures of which are incorporated herein by reference.

FIELD OF THE INVENTION

The invention relates generally to the field of projection screens. More particularly, the invention relates to the field of projections screens that are stored by rolling them around a generally cylindrical spool or reel.

BACKGROUND OF THE INVENTION

Projection screens are well known and have existed for many decades. Projection screens generally include a large expanse of reflective material upon which an image is projected by a projector. Because of the large size of projection screens, if a projection screen is flat and permanently placed, it generally makes the room unusable for many other purposes because of the large area that has been taken up by the spatial requirements of the projection screen. Accordingly, many projection screens are made to be stored or removed from sight when they are not in use. One way of storing a projection screen is to secure the flexible screen material or fabric to a spool or roll and then to roll the projection screen by rotating the spool or roll so that the projection screen is stored in a spiral wrapped around the roll.

Since the edge of the projection screen must be secured to the roll in some way, the edge has a finite thickness which protrudes from the roll. As further layers of the projection screen are rolled about the roller, the location at which the top edge of the projection screen is secured to the roller tends to leave an impression on following layers of material that are wrapped over it. After a period of time, a projection screen will develop a crease or seam imprint that appears periodically over the surface of the projection screen where the impression of the upper edge of the projection screen on the roller passes through the material of the screen. This is sometimes referred to as ladder marking. This periodically appearing imprint appearing in the screen disrupts the images projected on the screen and can be distracting to individuals viewing the projected image. Further, the periodic nature of the crease or seam eventually leads to unusual wear at the locations of the screen that correspond to the crease or seam and will cause the projection screen to require eventual replacement.

SUMMARY OF THE INVENTION

The invention disclosed herein solves many of the above discussed drawbacks of prior devices. According to an embodiment, the invention includes an intervening layer of cushioning material that is rolled onto the screen roller between the layers of projection screen material as they are rolled. The intervening layer of cushioning material prevents the ladder marking impression transfer of the location at which the attachment between the screen and the roller is made. According to one embodiment of the invention, the intervening layer of material has a length approximately equal to twice the circumference of the roller onto which the screen is rolled.

According to another embodiment of the invention, the roller has a stepped in portion having a depth approximately equal to the thickness of the projection screen material at the location where the projection screen material is secured to the roller. The stepped in portion causes the surface of the first layer of the projection screen material to be approximately the same height on the roller as the roller surface adjacent to the attachment point of the projection screen material.

According to an embodiment, the roller is formed of a sheet material rolled into a generally circular cylindrical structure and coupled to itself at a folded seam. According to an embodiment, the folded seam coincides with the location of the stepped in portion of the roller. The folded seam forms a discontinuity in the surface of the roller.

According to an embodiment, the material buffer or support material is laid over the back side of the material of the projection screen itself. According to another embodiment, the support material or material buffer is secured to the backside of the projection screen material at one circumference or less of the roller down from an edge of the projection screen material where the projection screen material is secured to the roller. According to an embodiment, the material buffer or support material can be polyethylene terephthalate film, such as Mylar, or other similar film made from polymer material. According to another embodiment of the invention, the support material may be a woven fabric or a non-woven fabric having appropriate thickness, stiffness, and/or cushioning qualities to prevent indentation of the projection screen that leads to ladder marking of the projection screen material. According to yet another embodiment of the invention, the support material may be formed of a non-woven fabric or other material such as spun-bonded polyolefin, polyester fiber, metal sheeting, or other film material of appropriate thickness to provide cushioning to the projection screen fabric or bridging of the projection screen material over the discontinuity in the roller.

Preferably, the material buffer or support material has a thickness of from about 0.5 mm to about 15 mm, and more preferably about 3 mm.

The invention may also include a method of minimizing ladder marking of a projection screen including securing a buffer material adjacent a back side of a projection screen material proximate a top edge of the projection screen material where the projection screen is secured to a roller.

The method further includes securing the buffer material to the roller at the same location where the projection screen material is secured to the roller.

According to another embodiment of the invention, the method further includes securing the buffer fabric or material to the projection screen material at a location less than one circumference of the roller from the location at which the projection screen material is secured to the roller.

In an embodiment a rolled projection screen includes a projection screen material having a reflective front surface onto which an image may be projected and a back surface, a roller to which the projection screen material is secured at an upper edge of the projection screen material, the projection screen material rolled about the roller in spiral fashion in multiple layers; and a buffer material secured to the roller or to the back surface of the projection screen material so as to be adjacent the back surface and so as to be interposed between at least some of the multiple layers of the projection screen material when the projection screen material is rolled about the roller.

The roller further can include a stepped in portion where the upper edge of the projection screen material is secured to the roller. The stepped in portion may be recessed by a distance approximately equal to a thickness of the projection screen material. In further embodiments, the buffer material may be a cushioning fabric, or a thin semi-rigid material.

The buffer material may have a thickness of from about 0.5 mm to about 15 mm, or a thickness of about 3 mm. The buffer material may have a length approximately equal to twice a circumference of the roller.

In further embodiments, the projection screen material can be secured to the roller at a first location with the buffer material also secured to the roller at a second location substantially coincident with the first location. Alternatively, the projection screen material can be secured to the roller at a first location and the buffer material can be secured to the projection screen material at a second location at a distance less than one circumference of the roller from the first location.

In an embodiment, a method of minimizing ladder marking of a rolled projection screen includes selecting a semi-rigid or cushioning masking material, disposing the masking material on a projection surface layer to form a projection screen, the projection surface layer presenting a projection surface on one side thereof, the masking material disposed on the side of the projection surface layer opposite the projection surface, attaching the projection screen to a generally cylindrical roller such that a surface discontinuity is formed where the projection screen is attached to the roller, and rolling the projection screen about the roller such that the projection screen forms multiple layers when rolled on the roller, the masking material acting to bridge the surface discontinuity so as to inhibit ladder marking of the projection surface layer.

Methods according to embodiments of the invention can include selecting a length of the masking material, in the direction the projection screen is rolled, of approximately equal to twice a circumference of the roller. The methods can also include selecting the masking material to have a thickness within the range of from about 0.5 mm to about 15 mm, and/or selecting the masking material to have a thickness of about 3 mm.

In further embodiments, a rolled projection screen includes a projection screen comprising a first layer and a second layer, the first layer presenting a reflective front surface onto which an image may be projected and a back surface, the second layer disposed so as to abut at least a portion of the back surface of the first layer, the projection screen presenting an upper edge, and a roller to which the projection screen is secured at the upper edge thereof and about which the projection screen is rolled in multiple layers such that the second layer of the projection screen is interposed between a plurality of successive first layers of the projection screen. The roller may define a surface discontinuity, and the second layer of the projection screen can be effective to bridge the discontinuity and thereby inhibit visibly discernable ladder marking of the first layer.

In embodiments, the second layer may be a cushioning fabric or a thin semi-rigid material. The first layer may be secured to the roller at a first location and the second layer may also be secured to the roller at a second location substantially coincident with the first location. Alternatively, the first layer may be secured to the roller at a first location and the second layer may be secured to the roller or the first layer at a second location at a distance less than one circumference of the roller from the first location.

BRIEF DESCRIPTION OF THE DRAWINGS

The embodiments of the present invention may be more completely understood in consideration of the following detailed description of various embodiments in connection with the accompanying drawings, in which:

FIG. 1 is an isometric view of a roller and screen including buffer material according to an embodiment of the invention;

FIG. 2 is a detail taken from FIG. 1 at labeled section A of FIG. 1;

FIG. 3 is a plan view of a roller with projection screen material and buffer material secured thereto;

FIG. 4 is a sectional view of the roller of FIG. 3 taken along section line 4-4 of FIG. 3; and FIG. 5 is a detail view taken from section 5 of FIG. 4.

While the present invention is amenable to various modifications and alternative forms, specifics thereof have been shown by way of example in the drawings and will be described in detail. It should be understood, however, that the intention is not to limit the present invention to the particular embodiments described. On the contrary, the intention is to cover all modifications, equivalents, and alternatives falling within the spirit and scope of the present invention.

DETAILED DESCRIPTION

Referring to FIGS. 1-5 and particularly to FIGS. 1 and 2, roller projection screen 10 according to the invention, generally includes projection screen material 12, roller 14, and buffer (masking) material 16. Projection screen 12 may include any type of projection screen fabric or material currently available and known to those of ordinary skill in the art as well as projection screen materials that may be developed in the future.

Referring particularly to FIGS. 2, 4, and 5, roller 14 generally includes roller body 18 which can be formed from sheet metal or other sheet material rolled into a generally cylindrical structure. Roller body 18 can also be formed by extrusion or other known manufacturing techniques. Roller body 18 generally presents seam 20. According to the depicted embodiment of the invention, seam 20 presents stepped in portion 22 forming a discontinuity 23 in the surface of roller body 18. Stepped in portion 22 is generally recessed below the adjacent portion of roller body 18 to a depth of approximately equal to the thickness of projection screen material 12. As depicted, seam 20 may include folded sheet metal seam 24.

Buffer material 16 may generally be a cushioning synthetic fabric material that is interposed between layers of projection screen material 12 to inhibit seam 20 from causing ladder marking of projection screen fabric 12. The choice of material or location of attachment should not be considered limiting.

According to one embodiment of the invention, buffer material 16 is approximately equal in width to projection screen material 12 and has a length approximately equal to twice the circumference of roller 14.

According to another embodiment of the invention, buffer material 16 is secured to the backside of projection screen fabric 12 at a location approximately where projection screen material 12 is secured to roller 14.

According to another embodiment of the invention, buffer material 16 is secured to the backside of projection screen material 12 at a location slightly less than the length of one circumference of roller 14 from the location at which projection screen material 12 is secured to the roller.

Referring particularly to FIGS. 2, 4 and 5, projection screen material 12 is adhesively secured to roller 14 at approximately the location of stepped in portion 22 of roller 14. Projection screen material 12 may also be secured to roller 14 by mechanical fastening. For example, projection screen material 12 can be clamped in seam 20, sewn or secured with fasteners.

Buffer material 16 may be secured to projection screen material 12 by adhesives, stitching or other mechanical fastening means.

Referring particularly to FIGS. 4 and 5, when projection screen material 12 is rolled about roller 14, buffer material 16 cushions projection screen material 12 thereby minimizing the transfer of ladder marking from seam 20 to projection screen material 12.

According to another embodiment of the invention, buffer material 16 is a very thin but relatively stiff material such as polyethylene terephthalate, Mylar®, or other similar polymer film. In other embodiments, buffer material 16 can be thin ductile metal, or woven or non-woven material such as spun-bonded polyolefin. According to another embodiment of the invention, buffer material 16 is a soft cushioning material such as polymer foam or textile fabric. In these cushioning embodiments, the thickness of buffer material 16 is preferably between about 0.5 mm to 15 mm, and more preferably about 3 mm.

The invention also includes a method of minimizing ladder marking of projection screen material 12 including securing buffer material 16 adjacent a back side of the projection screen material 12 proximate a top edge of the projection screen material 12 where projection screen material 12 is secured to roller 14.

The method further includes securing buffer material 16 to roller 14 at the same location where projection screen material 12 is secured to roller 14.

According to another embodiment of the invention, the method further includes securing buffer material 16 to projection screen material 12 at a location less than one circumference of roller 14 from the location at which the projection screen material 12 is secured to roller 14.

In operation, roller projection screen 10 is generally supported from an overhead support structure. Projection screen material 12 is secured to roller 14 at stepped in portion 22. According to one embodiment of the invention, buffer material 16 is secured to roller 14 at the same location as projection screen material 12.

According to another embodiment of the invention, buffer material 16 is secured to roller 14 at a location somewhat removed from stepped in portion 22 wherein projection screen material 12 is secured.

When projection screen material 12 is unrolled from roller 14, buffer material 16 remains out of sight behind projection screen material 12. When projection screen material 12 is rerolled onto roller 14, buffer material 16 is interposed between successive layers of projection screen material 12 as it is rolled, thereby providing a cushioning layer between projection screen material 12 and seam 20. The presence of this cushioning layer of buffer material 16 largely eliminates the impression transfer of ladder marking from seam 20 to projection screen material 12. According to another embodiment of the invention, buffer material 16 is secured to the backside of projection screen material 12 at a location less than one circumference of roller 14 from the top of projection screen material 12. Thus, buffer material 16 again is layered between successive layers of projection screen material 12 and minimizes or eliminates the transfer of ladder markings from seam 20 to projection screen material 12. According to another embodiment of the invention, buffer material 16 is a thin but somewhat ridged material that also serves to buffer projection screen material 12 from stepped in portion 22 and seam 20, thereby, again preventing ladder marking from seam 20 onto projection screen material 12.

The foregoing descriptions present numerous specific details that provide a thorough understanding of various embodiments of the invention. It will be apparent to one skilled in the art that various embodiments, having been disclosed herein, may be practiced without some or all of these specific details. In other instances, components as are known to those of ordinary skill in the art have not been described in detail herein in order to avoid unnecessarily obscuring the present invention. It is to be understood that even though numerous characteristics and advantages of various embodiments are set forth in the foregoing description, together with details of the structure and function of various embodiments, this disclosure is illustrative only. Other embodiments may be constructed that nevertheless employ the principles and spirit of the present invention. Accordingly, this application is intended to cover any adaptations or variations of the invention.

For purposes of interpreting the claims for the present invention, it is expressly intended that the provisions of 35 U.S.C. §112(f) are not to be invoked unless the specific terms "means for" or "step for" are recited in a claim.

The invention claimed is:

1. A rolled projection screen, comprising:
a projection screen material having a reflective front surface onto which an image may be projected and a back surface;
a roller to which the projection screen material is secured at an upper edge of the projection screen material, the projection screen material rolled about the roller in spiral fashion in multiple layers; and
a buffer material secured to the roller or to the back surface of the projection screen material so as to be adjacent the back surface and so as to be interposed between at least some of the multiple layers of the projection screen material when the projection screen material is rolled about the roller, the buffer material having a thickness of from 0.5 mm to 15 mm.

2. The rolled projection screen of claim 1, wherein the roller further comprises a stepped in portion where the upper edge of the projection screen material is secured to the roller.

3. The rolled projection screen of claim 2, wherein the stepped in portion is recessed by a distance approximately equal to a thickness of the projection screen material.

4. The rolled projection screen of claim 1, wherein the buffer material is a cushioning fabric.

5. The rolled projection screen of claim 1, wherein the buffer material is a thin semi-rigid material.

6. The rolled projection screen of claim 1, wherein the buffer material has a thickness of 3 mm.

7. The rolled projection screen of claim 1, wherein the buffer material has a length approximately equal to twice a circumference of the roller.

8. The rolled projection screen of claim 1, wherein the projection screen material is secured to the roller at a first location and the buffer material is also secured to the roller at a second location substantially coincident with the first location.

9. The rolled projection screen of claim 1, wherein the projection screen material is secured to the roller at a first location and the buffer material is secured to the projection screen material at a second location at a distance less than one circumference of the roller from the first location.

10. A method of minimizing ladder marking of a rolled projection screen, the method comprising:
   selecting a semi-rigid or cushioning masking material with a thickness within a range of from 0.5 mm to 15 mm;
   disposing the masking material on a projection surface layer to form a projection screen, the projection surface layer presenting a projection surface on one side thereof, the masking material disposed on the side of the projection surface layer opposite the projection surface;
   attaching the projection screen to a generally cylindrical roller such that a surface discontinuity is formed where the projection screen is attached to the roller; and
   rolling the projection screen about the roller such that the projection screen forms multiple layers when rolled on the roller, the masking material acting to bridge the surface discontinuity so as to inhibit ladder marking of the projection surface layer.

11. The method of claim 10, wherein the method includes selecting a length of the masking material, in the direction the projection screen is rolled, of approximately equal to twice a circumference of the roller.

12. The method of claim 10, wherein the method includes selecting the masking material to have a thickness of 3 mm.

13. A rolled projection screen, comprising:
   a projection screen comprising a first layer and a second layer, the first layer presenting a reflective front surface onto which an image may be projected and a back surface, the second layer disposed so as to abut at least a portion of the back surface of the first layer, the second layer having a thickness of from 0.5 mm to 15 mm, the projection screen presenting an upper edge; and
   a roller to which the projection screen is secured at the upper edge thereof and about which the projection screen is rolled in multiple layers such that the second layer of the projection screen is interposed between a plurality of successive first layers of the projection screen.

14. The rolled projection screen of claim 13, wherein the roller defines a surface discontinuity, and the second layer of the projection screen is effective to bridge the discontinuity and thereby inhibit visibly discernable ladder marking of the first layer.

15. The rolled projection screen of claim 13, wherein the second layer is a cushioning fabric.

16. The rolled projection screen of claim 13, wherein the second layer is a thin semi-rigid material.

17. The rolled projection screen of claim 13, wherein the first layer is secured to the roller at a first location and the second layer is also secured to the roller at a second location substantially coincident with the first location.

18. The rolled projection screen of claim 13, wherein the first layer is secured to the roller at a first location and the second layer is secured to the roller or the first layer at a second location at a distance less than one circumference of the roller from the first location.

* * * * *